United States Patent [19]

Kondo et al.

[11] Patent Number: 5,117,299

[45] Date of Patent: May 26, 1992

[54] LIQUID CRYSTAL DISPLAY WITH A LIGHT BLOCKING FILM OF HARD CARBON

[75] Inventors: Hitoshi Kondo, Machida; Yuji Kimura; Eiichi Ohta, both of Yokohama, all of Japan

[73] Assignee: Ricoh Company, Ltd., Tokyo, Japan

[21] Appl. No.: 767,362

[22] Filed: Sep. 30, 1991

Related U.S. Application Data

[63] Continuation of Ser. No. 523,559, May 15, 1990, abandoned.

[30] Foreign Application Priority Data

May 20, 1989 [JP] Japan .................................. 1-127290

[51] Int. Cl.$^5$ .......................... G02F 1/133; B32B 9/00; B01J 3/06; G09G 3/36
[52] U.S. Cl. ........................................ 359/58; 359/67; 359/79; 423/446; 156/DIG. 68; 428/408; 340/784
[58] Field of Search .................... 340/784; 428/408; 156/DIG. 68; 423/446; 350/331 R, 332 R, 333, 334, 335 US, 336 US; 357/58; 359/67 US, 58 US, 79 US

[56] References Cited

U.S. PATENT DOCUMENTS

| | | | |
|---|---|---|---|
| 4,436,797 | 3/1984 | Brady et al. | 428/408 X |
| 4,486,286 | 12/1984 | Lewin et al. | 428/408 X |
| 4,597,844 | 7/1986 | Hiraki et al. | 428/408 X |
| 4,904,056 | 2/1990 | Castleberry | 350/333 |
| 4,932,331 | 6/1990 | Kurihara et al. | 423/446 X |
| 4,943,143 | 7/1990 | Yamashita | 350/339 R |

FOREIGN PATENT DOCUMENTS

| | | |
|---|---|---|
| 63-175802 | 7/1980 | Japan . |
| 63-064023 | 3/1988 | Japan . |
| 64-40929 | 2/1989 | Japan . |
| 64-55540 | 3/1989 | Japan . |

OTHER PUBLICATIONS

Ebihara et al., Extended Abstracts: Diamond and Diamond-Like Materials Synthesis, "Amorphous Carbon Film . . . Inductive Plasma", Apr. 9, 1988, pp. 45–48.

Woollam et al., Extended Abstracts: Technology Update on Diamond Films, "Diamondlike Carbon . . . Optical Materials", Apr. 25, 1989, pp. 27–32.

Spitsyn et al., Extended Abstracts: Diamond . . . Synthesis, "The Growth . . . Gas Phase", Apr. 9, 1988, pp. 3–14.

Pouch et al., Extended Abstracts: Diamond . . . Synthesis, "Deposition of Thin Carbon Films", Apr. 9, 1988, pp. 53–54.

"Use of Black Diamondlike Carbon Films as a Contrast Enhancement Layer for Liquid-Crystal Displays", by B. singh et al., Applied Physics Letters, vol. 57, No. 22, pp. 2288–2290.

Primary Examiner—Stanley D. Miller
Assistant Examiner—Ron Trice
Attorney, Agent, or Firm—Oblon, Spivak, McClelland, Maier & Neustadt

[57] ABSTRACT

Disclosed herein is a liquid crystal display comprising liquid crystal material sandwiched between two substrates, a plurality of picture element electrodes disposed on at least one of the substrates, a lead electrode connected with the picture element electrodes by means of at least one conductor-insulator-conductor device, and a light-shielding layer disposed in a region other than the display region on at least one of the substrates, the insulator being a hard carbon film. The insulator may simultaneously serve as a light-shielding layer, wherein a hard carbon film having a thickness of 1100 to 8000 Å, a specific resistivity ($\rho$) of $10^6$ to $10^{13}$ ohm cm, an optical band gap ($E_{gopt}$) of 1.0 to 3.0 eV, a hydrogen amount in the film ($C_H$) of 10 to 50 atom %, an SP$^3$/SP$^2$ ratio of 2–4, a Vickers hardness of 2500 to 9500 kg·mm$^{-2}$, a refractive index (n) of 1.9 to 2.4, a defect density of $10^{17}$ to $10^{19}$ cm$^{-3}$, a specific dielectric constant of 2 to 6, and an average optical density in the visible ray region of not less than 0.5 is used.

4 Claims, 3 Drawing Sheets

LIQUID CRYSTAL DISPLAY WITH A LIGHT BLOCKING FILM OF HARD CARBON

This application is a continuation of application Ser. No. 07/523,559, filed on May 15, 1990, now abandoned.

BACKGROUND OF THE INVENTION

The present invention relates to an active matrix-type liquid crystal display having an MIM (Metal-Insulator-Metal) device as a switching device and a light shielding layer disposed in a non-display region on at least one of the substrates, which can be used suitably as a flat-panel display for office automation equipment, television sets, etc.

Most liquid crystal displays at present have now been changed from a simple matrix-type panel to an active matrix-type panel, because there is a demand for liquid crystal panels of large area in office automation terminal equipment, liquid crystal television sets, etc. In the active matrix-type, a switch is disposed to each picture element in order to hold a voltage.

MIM devices have often been used as one of the switches, because the MIM device shows an excellent non-linear current-voltage characteristic for switching. MIM devices known so far include one in which a lower metal electrode of Ta, Al or Ti is disposed on an insulation substrate such as a glass plate, an insulator film of $SiO_x$, $SiN_x$ or an oxide of the metals mentioned above, disposed above the lower electrode and an upper metal electrode of Al or Cr disposed above the insulator film.

However, the MIM device using a metal oxide as an insulator (insulator layer) described in Japanese Patent Application Laid-Open (KOKAI) Nos. 57-196589 (1982), 61-232689 (1986) and 62-62333 (1987), has drawbacks as described below. Since the insulator layer is formed by anodization or thermal oxidation of the lower electrode, production steps are complicated and require high temperature heat-treatment necessary in anodization for sure removal of impurity, etc.). In addition, since the film controllability (homogenity and reproducibility of film quality and thickness) is poor, the substrate is limited to heat-resistant material, and the insulator layer should be made of a metal oxide of constant physical property. As a result, the material and the characteristic of the device can not be changed, thereby restricting the degrees of freedom in view of the design. This means that it is impossible to design and manufacture a device capable of sufficiently satisfying the specifications demanded for a liquid crystal display incorporated with the MIM devices.

Further, if the film controllability is poor, the current (I)-voltage (V) characteristic, and in particular, the symmetry of the I-V characteristic (current ratio $I_{-}/I_{30}$, between positive bias and negative bias) varies greatly.

In addition, in the case of using an MIM device for a liquid crystal display (LCD), since the ratio of liquid crystal capacitance/MIM device capacitance of not less than 10 is generally required, it is desirable that the capacity of the MIM device is smaller. However, since the dielectric constant of a metal oxide film is high, the device capacitance is also high. Accordingly, it is necessary for precision fabrication to reduce the device capacitance by reducing the device area. In this case, the insulator layer suffers from mechanical damage upon sealing the liquid crystal material (in the rubbing step, etc.). Also, the production yield is lowered, being coupled with the requirement in precision fabrication.

In an MIM device using $SiO_x$ or $SiN_x$ for the insulator layer (refer to Japanese Patent Application Laid-Open (KOKAI) No. 61-275819), the insulator layer is formed by a vapor phase method such as plasma CVD or sputtering. However, since a substrate temperature of about 300° C. is usually necessary, it is impossible to use inexpensive substrates. In addition, upon preparing a large area device, the thickness and quality of the insulator layer may tend to be uneven owing to the temperature distribution of the substrate. Further, since the insulator layer is often formed in the vapor phase, dusts are generated in a great amount, resulting in a lot of pinholes in the insulator layer, thereby reducing the production yield of the device. Further, large stresses are caused in the insulator layer, bringing about peeling, and as a result, the device yield is lowered.

In addition, in a conventional liquid crystal display, switching devices such as the MIM device and lead electrodes are disposed in regions other than picture element electrodes. Accordingly, even if an opaque material such as a thin metal film is used for the electrode material, inter-electrode spaces, etc. are often present and as a result, so-called non-modulation light which is not effective for the operation of liquid crystals transmitted through the region. The non-modulation light means that leakage light is always present in the liquid crystal display, which reduces the contrast.

Further, a method of disposing a light-shielding layer on a substrate opposing the substrate of a switching device using TFT is known (Japanese Patent Application Laid-Open (KOKAI) No. 61-38931). A method of coating with a light-shielding insulator film on a region other than the picture element electrode on a substrate disposed with a non-linear device (mainly TFT) is also known. However, a liquid crystal display of low cost and with no picture-quality deterioration can not be obtained at present by merely employing these methods. Accordingly, it is an object of the present invention to provide a liquid crystal display of low cost with no picture quality deterioration by using a hard carbon film as a MIM insulating layer, which can also be used as a light blocking layer.

As a result of the present inventors' earnest studies for overcoming the foregoing drawbacks, it has been found that in a liquid crystal display comprising liquid crystal material sandwiched between two substrates, by (i) connecting each of a plurality of picture element electrodes disposed on at least one of the substrates with a lead electrode by means of at least one MIM (metal-insulator-metal) device; (ii) disposing a light-shielding layer on a region other than a display region of at least one of the substrates; and (iii) using a hard carbon film as the insulator of the MIM device, a liquid crystal display is obtainable at a relatively low temperature and by a simple method. The present liquid crystal display has highly reliable switching device having an insulator layer (hard carbon film) of low dielectric constant excellent in film controllability and mechanical strength. The present liquid crystal display is also capable of obtaining a high contrast display, with no leakage of light. The present invention has been accomplished based on the above-mentioned finding.

SUMMARY OF THE INVENTION

In one aspect of the present invention, there is provided a liquid crystal display comprising liquid crystal material sandwiched between two substrates, a plurality of picture element electrodes disposed on at least one of the substrates, a lead electrode connected with the picture element electrodes by means of at least one conductor-insulator-conductor device, and a light-shielding layer disposed in a region other than the display region on at least one of the substrates, the insulator being a hard carbon film.

DETAILED DESCRIPTION OF THE INVENTION

Figure 1A:
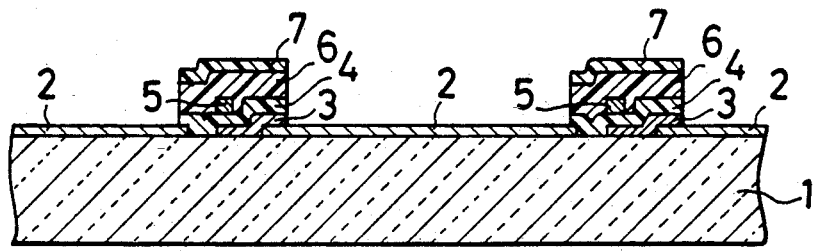
FIGS. 1(a–b) 5 and 6 are, respectively, schematic views for liquid crystal display according to the present invention.
Figure 1B:
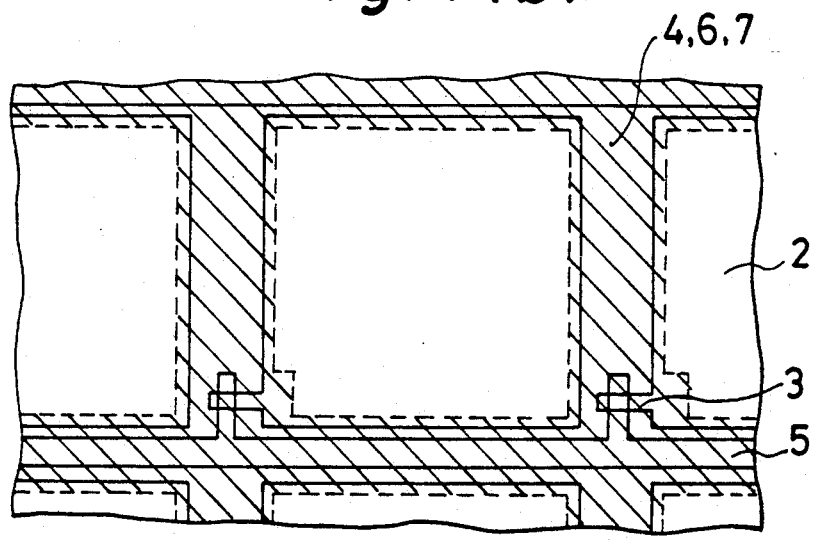

FIG. 1 shows one embodiment for the main portion of a liquid crystal display according to the present invention, which illustrates the constitution of layers disposed on one of the substrates. FIG. 1(a) is a cross sectional view and FIG. 1(b) is a plan view, in which are shown a transparent substrate 1, a picture element electrode 2, a lower electrode 3, insulator films (insulator layer) 4 and 6, an upper electrode 5 (lead electrode) and light-shielding layer 7. The light-shielding layer 7 is disposed in a region other than the display region, while the MIM device comprises a metal layer connected with the lower electrode 3, a metal layer connected with the upper electrode 5 and an insulator film 4 sandwiched between the two metal layers.

As the lower electrode, there may be an electroconductive material of Al, Ta, Cr, Ti, Cu, W, Mo, Pt, Ni, Au, Ag, ITO, ZnO:Al, In$_2$O$_3$ or SnO$_2$ formed to a thickness from several hundreds to several thousands of Å by a vaccum deposition method, sputtering method, etc. Further, as the upper electrode, there can be used an electroconductive material of Al, Cr, Ni, Mo, Pt, Ag, Ti, Cu, Au, W, Ta, ITO, ZnO:Al, In$_2$O$_3$, SnO$_2$ formed to a thickness of from several hundreds to several thousands of Å by a vaccum deposition method, sputtering method, etc.

Figure 7A:
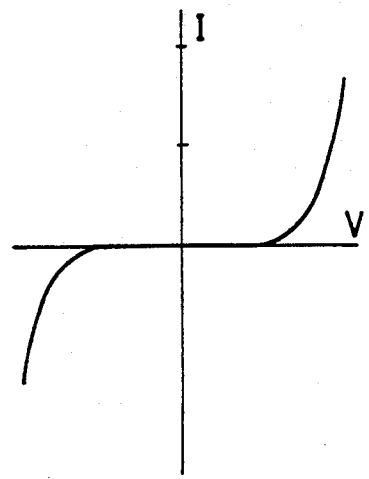
FIGS. 7(a–b) shows current-voltage characteristic curves of an MIM device.
Figure 7B:
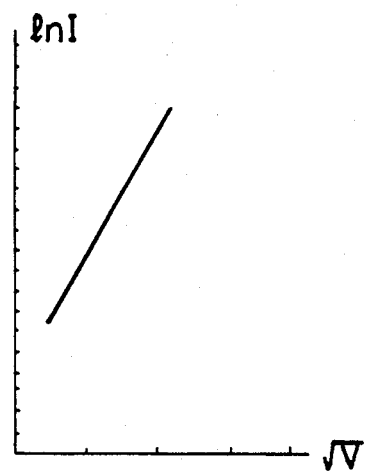

Ni, Pt, Ag are preferred since they are particularly excellent in view of the stability and the reliability of the I-V characteristic. An MIM device using a hard carbon film as the insulator layer shows no change in its symmetric I-V property, and it provides Pool Frenkel-type conduction as can be seen from the relationship: ln I$^\alpha\sqrt{v}$, as shown in FIG. 7(b). Also in view of the above, it can be seen that the upper electrode and the lower electrode may be combined in any manner in the case of the MIM device of this type. However, degradation and change of device characteristic (I-V characteristic) are caused due to the adhesion strength and the state of the boundary between the hard carbon film and the electrode. In view of the above, Ni, Pt and Ag are preferred.

In the liquid crystal display according to the present invention, a light-shielding layer 7 is formed in a region other than the display region. With such a means, non-modulation light is not transmitted and a high contrast display can be obtained.

The light-shielding layer 7 can be formed with opaque materials of organic material (incorporated, if necessary, with dye or pigment) or inorganic material.

Figure 5:
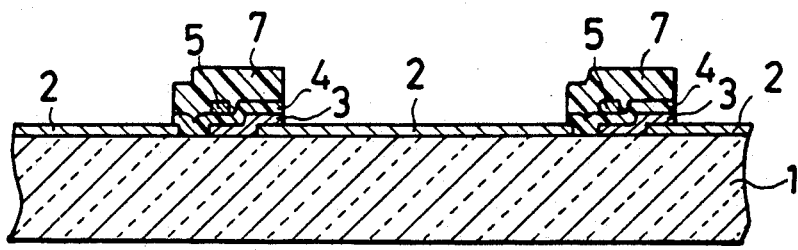
Figure 6:
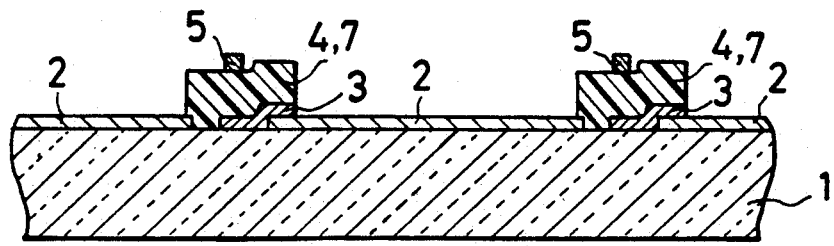

If the light-shielding layer is insulative, the insulator layer 6 shown in FIG. 1 can be omitted (FIG. 5). Further, if the insulator layer 4 of the MIM device may be made of the opaque material, the insulator layer 6 may double as a light-shielding layer (FIG. 6).

The hard carbon film as the insulator layer used in the MIM device according to the present invention contains amorphous and/or microcrystalline material composed of carbon atoms and hydrogen atoms as the main constituent elements, which is also referred to as i-C film, diamond-like carbon film, amorphous diamond film and diamond thin film.

The physical properties of the hard carbon film as the insulator layer can be controlled over a wide range of values depending on the film-forming conditions as described later. Accordingly, the resistance value of the insulator layer ranges from that of a semi-insulator to an insulator and, in this meaning, it can be considered as an MSI (metal-semi-insulator) device as shown in Japanese Patent Application Laid-Open (KOKAI) No. 61-275819.

As has been described above, the hard carbon film described in U.S. patent application Ser. No. 07/360,246 filed on June 1, 1989 can be used as the insulator layer in a MIM device comprising an insulation substrate, a lower electrode, an insulator layer and an upper electrode, disposed on the insulation substrate in the order given.

For forming the hard carbon film in the present invention, a mixture of a gas of an organic compound, preferably a hydrocarbon gas, with a gas of another compound described later is used as the starting material. The starting material gas is not necessarily in the vapor phase under normal temperature and normal pressure, and any material in a liquid or solid phase under normal temperature and normal pressure may also be used as long as it is gasifiable by way of melting, evaporization, sublimation, etc. by heating or reduced pressure.

For the hydrocarbon gas, all hydrocarbons may be used, such as paraffin hydrocarbons (for example, CH$_4$, C$_2$H$_6$, C$_3$H$_8$ and C$_4$H$_{10}$ olefin hydrocarbons, (for example, C$_2$H$_4$ and C$_3$H$_6$) acetylene hydrocarbons such as C$_2$H$_2$, diolefin hydrocarbons and aromatic hydrocarbons.

Further, in addition to hydrocarbons, those compounds capable of forming carbon such as alcohols, ketones, ethers, esters, CO and CO$_2$ may also be used. However, if CO or CO$_2$ is used, hydrogen or hydrocarbons may also be used as occasion demands.

As a method of forming a hard carbon film from a starting material gas in the present invention, it is preferred to use a method in which active species are formed by way of a plasma state formed by a plasma method using direct current, low frequency wave, high frequency wave or microwave. A method of utilizing magnetic field effects is more preferred for deposition under a low pressure with an aim of increasing the area, improving the uniformity and forming a film at low temperature.

Further, the active species can be formed also by thermal decomposition at high temperature. In addition, active species may be formed by way of an ionized state formed by ionization deposition or ion beam deposition, or formed from neutral species generated by vacuum deposition or sputtering. Further, active species may be formed by a combination of the above methods.

One example for the deposition conditions of the hard carbon film thus formed in a case of the plasma CVD method is set forth as follows:

| | |
|---|---|
| RF power | 0.1–50 W/cm$^2$ |
| Pressure | 10$^{-3}$–10 Torr |
| Deposition temperature | room temperature 950° C., preferably, room temperature–300° C. |

When the starting material gas is decomposed into radicals and ions in the plasma state the thus produced radicals and ions then react to form a hard carbon film on the substrate containing at least in part an amorphous state (a-C:H), which may contain microcrystalline grains of about 50 Å to 5 μm. The hard carbon film may contain a high proportion of microcrystal grains, or on the other hand, a high proportion of amorphous material. Various properties of the hard carbon film are shown in Table 1.

TABLE 1

| | |
|---|---|
| Specific resistivity (ρ) | 10$^6$–10$^{13}$ ohm · cm |
| Optical band gap (Egopt) | 1.0–3.0 (eV) |
| Amount of hydrogen atom in the film (C$_H$) | 10–50 atm % |
| SP$^3$/SP$^2$ ratio | 2/1–4/1 |
| Vickers hardness (H) | 2500–9500 kg · mm$^{-2}$ |
| Refractance (n) | 1.9–2.4 |
| Defect density | 10$^{17}$–10$^{19}$ cm$^{-3}$ |

(Note)
Measuring method:
Specific resistivity (ρ): determined from I-V characteristics by a coplanar type cell.
Optical band gap (Egopt): absorption coefficient (α) is determined from spectral characteristics and then determined by the relationship: $(\alpha h\nu)^{\frac{1}{2}} = \beta(h\nu - Egopt)$
Amount of hydrogen atom in the film (C$_H$): determined by integrating peaks near 2900 cm$^{-1}$ from IR absorption, which is multiplied by an absorption cross section A. That is:
$C_H = A \cdot \int \frac{\alpha(W)}{W} \cdot dW$
SP$^3$/SP$^2$ ratio: determined by area ratio of SP$^3$ to SP$^2$, which are obtained by converting the IR absorption spectrum into Gauss functions belonging respectively to SP$^3$ and SP$^2$.
Vickers hardness (H): determined by microvickers meter.
Refractive index (n): determined by ellipsometer.
Defect density: determined by ESR.

Figure 2:
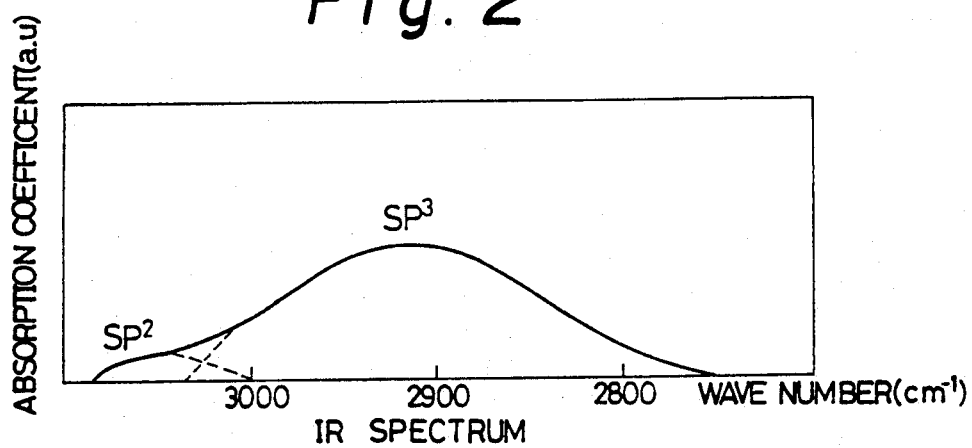
FIGS. 2, 3 and 4 are graphs for explaining the properties of a hard carbon film in the present invention.
Figure 3:
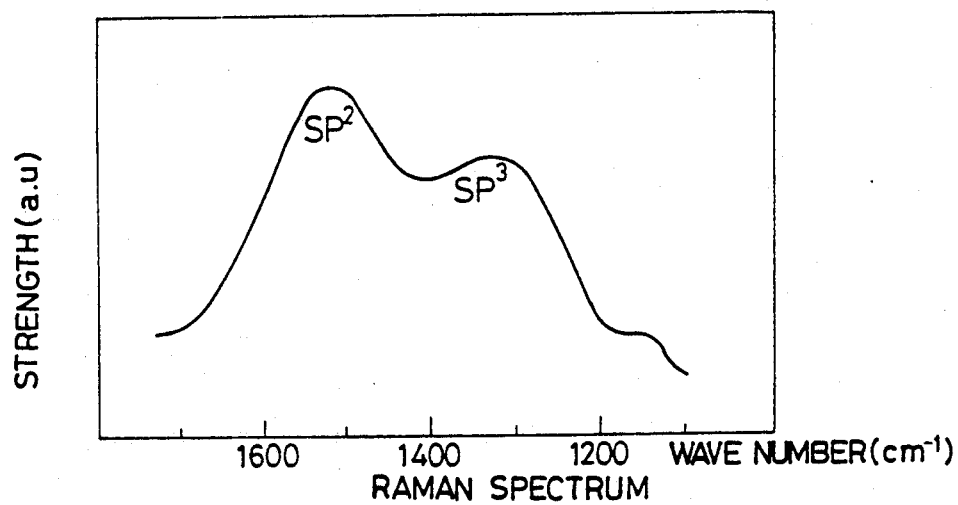
Figure 4:
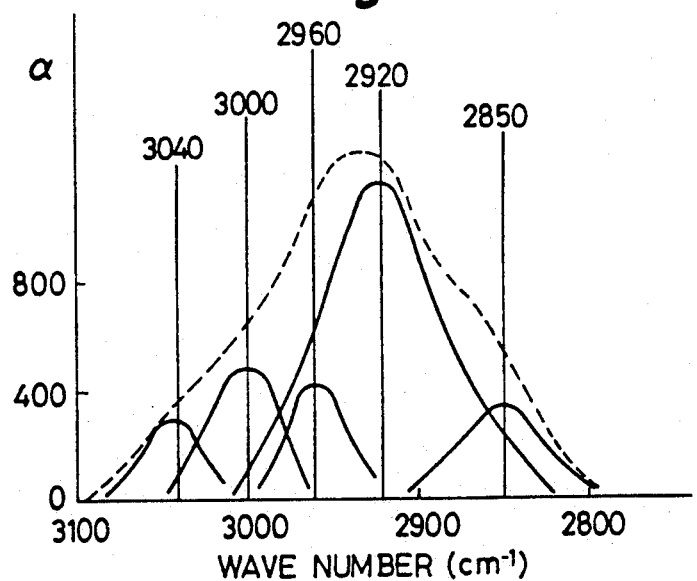

In the analysis by IR absorption and Raman spectroscopy for the thus formed hard carbon film, it can be seen that interatom bondings of carbon atoms in hybrid orbit for SP$^3$ and hybrid orbit for SP$^2$ are present together and that the corresponding absorption peaks overlap, as shown in FIG. 2 and FIG. 3. The ratio of SP$^3$ bonds to SP$^2$ bonds is generally estimated by peak-separation of the IR spectrum. In the IR spectrum, many modes of the spectrum are measured superposing to each other in the range from 2800 to 3150 cm$^{-1}$, the respective wave numbers of peaks corresponding to these modes being known. The SP$^3$/SP$^2$ ratio can be determined by conducting peak separation according to the Gauss distribution as shown in FIG. 4, then calculating each of the peak areas.

Further, from X-ray and electron diffractiometry, it can be determined whether the film is in the form of an amorphous state (a-C:H), and whether microcrystalline grains of about 50 Å to 5 μm are present.

In the case of a plasma CVD method which is generally suitable to mass production, specific resistivity and hardness of a film are increased as the RF power is lower, and since the life of the active species is increased as a pressure is lower, it is possible to lower the temperature of the substrate and attain uniform quality in a large area, resulting in an increase in specific resistivity and the hardness of the film. Further, since the plasma density is reduced at a lower pressure, a method utilizing the effect of magnetic field confinement is effective, due to the increase of the specific resistivity.

Furthermore, since by this method a hard carbon film of good quality can be formed under relatively lower temperature conditions of from normal temperature to about 150° C., it is optimal to conduct the manufacturing process of an MIM device at low temperature. Accordingly, it is possible to widen the degrees of freedom for selecting the material of the substrate used and to form a uniform film of a large area, due to easy control of the substrate temperature. Further, since a wide range of structures and physical properties of the hard carbon film can be obtained, desired device characteristics can be designed freely.

The current-voltage characteristic (I-V characteristic) of the MIM device in the present invention is approximated by the following conduction formula:

$$I = \kappa \exp(\beta V^{\frac{1}{2}}) \qquad (1)$$

wherein
κ: electroconduction coefficient
β: Pool-Frenkel coefficient (coefficient representing the steepness of I-V characteristic, hereinafter referred to as "steepness").

The relationships between κ, β and various physical properties of the hard carbon film are represented by the following formulae:

$$\kappa = \frac{n\mu q}{d} \exp\left(\frac{-\phi}{kT}\right) \propto \frac{1}{\rho d} \quad (T = \text{constant}) \qquad (2)$$

$$\beta = \frac{1}{kT}\left(\frac{q^3}{\pi\epsilon_r\epsilon_0 d}\right)^{\frac{1}{2}} \propto \frac{1}{\sqrt{\epsilon_r d}} \quad (T = \text{constant}) \qquad (3)$$

wherein
n: carrier density
μ: carrier mobility
q: charging amount of electrons
φ: trap depth
ρ: specific resistivity
d: thickness of hard carbon film
k: Boltzman constant
T: atmospheric temperature
$\epsilon_r$: specific dielectric constant of hard carbon film
$\epsilon_0$: dielectric constant in vacuum The merits of using the hard carbon film in view of the formulae (2) and (3) are considered as described below.

(i) Since the specific dielectric constant $\epsilon_r$ of the hard carbon film is as small as 2–6, the steepness β is larger as compared with other insulator (for example, Ta$_2$O$_5$, Al$_2$O$_3$, SiOx, SiNx, SiCx, etc.) and the ratio of ON current (I$_{ON}$) to OFF current (I$_{OFF}$) can be made greater. Liquid crystals can be driven at a lower duty ratio, thereby realizing a high density (highly accurate) LCD. Further, since the low specific dielectric constant of the film allows preparation of a larger size for a device with an identical electrical capacitance, high precision fabrication is not required and the yield can be improved. (In view of the driving conditions, a capacitance ratio (C$_{LCD}$/C$_{MIN}$) of not smaller than about 10/1 is necessary between the capacitance of the LCD and the MIM).

(ii) Since the specific resistivity of $\rho$ of the hard carbon film can be controlled within a wide range of $10^6$ to $10^{13}$ ohm·cm, the electroconduction coefficient $\kappa$ can freely be varied so as to be suitable for the specification demanded for the LCD. That is, the device can be easily designed and the specifications easily controlled.

(iii) Further, since the hardness of the film is high, it suffers less from damages by the rubbing treatment upon sealing liquid crystal material and the yield can be improved also in this regard. As a result, an LCD at a reduced cost, with good gradation (coloration) and high density can be realized by using such a hard carbon film.

The thickness of the hard carbon film for the MIM device usable in the present invention is from 100 to 8000 Å, preferably 200 to 6000 Å, more preferably 300 to 4000 Å.

For controlling the resistance value, improving the stability and heat resistance of the hard carbon film and, further, for improving the hardness of the hard carbon film, as additional ingredient(s) at least one of element selected from the group consisting of group III, group IV and group V elements of the periodic table, alkali metal elements, alkaline earth metal elements, nitrogen, oxygen, chalcogen elements and halogens can be incorporated therein (as disclosed in U.S. patent application, Ser. No. (unknown) filed on Feb. 22, 1990). The stability of the device and degrees of freedom for the device design can further be improved by the doping of the third ingredient.

The amount of hydrogen atoms contained as one of the constituent elements in the hard carbon film according to the present invention is from 10 to 50 atomic %, preferably 20 to 45 atomic % based on the whole of the constituent atoms of the hard carbon film. Also, the amount of carbon atoms contained as one of the constituent elements in the hard carbon film according to the present invention is from 50 to 90 atomic %, preferably, 55 to 80 atomic % based on the whole of the constituent atoms of the hard carbon film.

Group III elements of the periodic table are exemplified by B, Al, Ga and In, and the amount of the group III element(s) contained as one of the constituent elements in the hard carbon film according to the present invention is not more than 5 atomic %, preferably from 0.001 to 3 atomic % based on the whole of the constituent atoms of the hard carbon film.

Group IV elements of the periodic table are exemplified by Si, Ge and Sn, and the amount of the group IV elements contained therein as one of the constituent elements is not more than 20 atomic %, preferably from 0.01 to 17 atomic % based on the whole of the constituent atoms of the hard carbon film.

Group V elements of the periodic table are exemplified by P, As and Sb, and the amount of the group V element(s) contained therein as one of the constituent elements is not more than 5 atomic %, preferably from 0.001 to 3 atomic % based on the whole of the constituent atoms of the hard carbon film.

Alkali metal elements are exemplified by Li, Na and K, and the amount of the alkali metal element(s) contained therein as one of the constituent elements is not more than 5 atomic %, preferably from 0.001 to 3 atomic % based on the whole of the constituent atoms of the hard carbon film.

Alkaline earth metal elements are exemplified by Ca and Mg, and the amount of the alkaline earth metal element(s) contained therein as one of the constituent elements is not more than 5 atomic %, preferably from 0.001 to 3 atomic % based on the whole of the constituent atoms of the hard carbon film.

The amount of nitrogen contained therein as one of the constituent elements is not more than 5 atomic %, preferably from 0.001 to 3 atomic % based on the whole of the constituent atoms of the hard carbon film.

The amount of oxygen contained therein as one of the constituent elements is not more than 5 atomic %, preferably from 0.001 to 3 atomic % based on the whole of the constituent atoms of the hard carbon film.

Chalcogen elements are exemplified by S, Se and Te, and the amount of chalcogen element(s) contained therein as one of the constituent elements is not more than 20 atomic %, preferably from 0.01 to 17 atomic % based on the whole of the constituent atoms of the hard carbon film.

Halogens are exemplified by F, Cl, Br and I, and the amount of the halogens contained therein as one of the constituent elements is not more than 35 atomic %, preferably from 0.1 to 35 atomic % based on the whole of the constituent atoms of the hard carbon film.

The amount of the elements or the atoms described above can be measured by a customary method of elemental analysis, for example, Auger analysis.

For incorporating at least one element selected from the group consisting of group III, element of the periodical group IV element of the periodical elements group V element of the periodic table, alkali metal elements, alkaline earth metal elements, nitrogen, oxygen, chalcogen elements or halogens as additional ingredient element(s), a gas of a compound (or molecule) containing these elements is used as the starting material, in addition to the organic compound gas and hydrogen gas used, if necessary.

Compounds containing an element belonging to group III of the periodic table are exemplified by $B(OC_2H_5)_3$, $B_2H_6$, $BCl_3$, $BBr_3$, $BF_3$, $Al(O-i-C_3H_7)_3$, $(CH_3)_3Al$, $(C_2H_5)_3Al$, $(i-C_4H_3)_3Al$, $AlCl_3$, $Ga(O-i-C_3H_7)_3$, $(CH_3)_3Ga$, $(C_2H_5)_3Ga$, $GaCl_3$, $GaBr_3$, $(O-i-C_3H_7)_3In$, and $(C_2H_5)_3In$.

Compounds containing an element belonging to group IV of the periodic table are exemplified by $SiH_4$, $Si_2H_6$, $Si_3H_8$, $(C_2H_5)_3SiH$, $SiF_4$, $SiH_2Cl_2$, $SiCl_4$, $Si(OCH_3)_4$, $Si(OC_2H_5)_4$, $Si(OC_3H_7)_4$, $GeCl_4$, $GeH_4$, $Ge(OC_2H_5)_4$, $Ge(C_2H_5)_4$, $(CH_3)_4Sn$, $(C_2H_5)_4Sn$, and $SnCl_4$.

Compounds containing an element belonging to group V of the periodic table are exemplified by $PH_3$, $PF_3$, $PCl_2F_3$, $PCl_3$, $PCl_2F$, $PBr_3$, $PO(OCH_3)_3$, $P(C_2H_5)_3$, $POCl_3$, $AsH_3$, $AsCl_2$, $AsBr_3$, $AsF_3$, $AsF_5$, $AsCl_3$, $SbH_3$, $SbF_3$, $SbCl_3$, and $Sb(OC_2H_5)_3$.

Compounds containing alkali metal elements are exemplified by $LiO-i-C_3H_7$, $NaO-i-C_3H_7$ and $KO-i-C_3H_7$.

Compounds containing alkaline earth metal elements are exemplified $Ca(O_2H_5)_3$, $Mg(OC_2H_5)_2$ and $(C_2H_5)_2Mg$.

Compounds containing nitrogen are exemplified by nitrogen gas, inorganic compounds such as ammonia, organic compounds having one or more functional groups such as amino and cyano groups, as well as heterocyclic rings containing nitrogen atoms; etc.

Compounds containing oxygen are exemplified by inorganic compounds such as oxygen gas, ozone, water (steam), hydrogen peroxide, carbon monoxide, carbon dioxide, carbon sub-oxide, nitrogen monoxide, nitrogen dioxide, dinitrogen trioxide, dinitrogen pentoxide, nitrogen trioxide, etc.; organic compounds containing one or more functional groups such as hydroxy, aldehyde, acyl, ketone, nitro, nitroso, sulfone, ether and ester groups as well as peptide bonding (amide group) and heterocyclic rings containing oxygen atom(s); and metal alkoxides.

Compounds containing chalcogen elements are exemplified by $H_2S$, $(CH_3)(CH_2)_4S(CH_2)_4CH_3$, $CH_2=CHCH_2SCH_2CH=CH_2$, $C_2H_5SC_2H_5$, $C_2H_5SCH_3$, thiophene, $H_2Se$, $(C_2H_5)_2Se$, $H_2Te$, etc.

Further, compounds containing halogens are exemplified by inorganic compounds such as fluorine, chlorine, bromine, iodine, hydrogen fluoride, chlorine fluoride, bromine fluoride, fluorocarbons, iodine fluoride, hydrogen chloride, bromine chloride, iodine chloride, hydrogen bromide, iodine bromide and hydrogen iodide, and organic compounds such as alkyl halides, aryl halide, styrene halides, polymethylene halides and halforms.

The light-shielding layer in the present invention is exemplified by (1) an opaque material such as Al, Ta, Ti, Cr, Ni, Cu, Au, Ag, W, Mo, Pt, Si, C and TiC formed as a film to a thickness from 100 to 8000 Å, preferably 300 to 4000 Å by a sputtering method, vacdum deposition method or CVD method; (2) insulative material having an average optical density of not less than about 1.0 in a visible ray region, for example, a polymer selected from polyimides, polyimides polyester, imides, polyester amides, polyether sulfones, etc., incorporated with a black dye such as carbon black, aniline black (or other organic black dye) and hard carbon film, having a thickness of 1000 Å to 5 μm, preferably, 2000 Å to 2 μm, formed by a coating method (spin coating method, roll coating method, etc.) or a vapor phase method such as plasma CVD or an ion beam method; and (3) the hard carbon film used in common for the insulator layer as described above (film thickness of 1100 to 8000 Å, preferably 3000 to 6000 Å).

The light-shielding layer in the liquid crystal display according to the present invention has an average optical density of not less than 0.5, preferably not less than 1.0, more preferably not less than 1.15. The average optical density in the present invention is measured by using a usual spectral transmittance measuring device.

The optical density (Aλ) at a wavelength (λ) is represented by the transmittance (Tλ) as below.

$$A\lambda = \log(1/T\lambda)$$

The average value for the optical density (Aλ) in the visible region (λ=400-700 nm) is the average optical density.

Among the light-shielding layers described above, a combined use of a hard carbon film as the insulator layer for the MIM device and as a light-shielding layer (as shown in FIG. 6) is particularly preferred in view of shortening the production steps, improving the production yield, etc. The properties of the light-shielding layer will be explained below.

The optical density of the hard carbon film tends to be reduced toward the longer wavelengths. The film thickness dependency of the average optical density in the visible ray region is as shown in FIG. 8.

Figure 8:
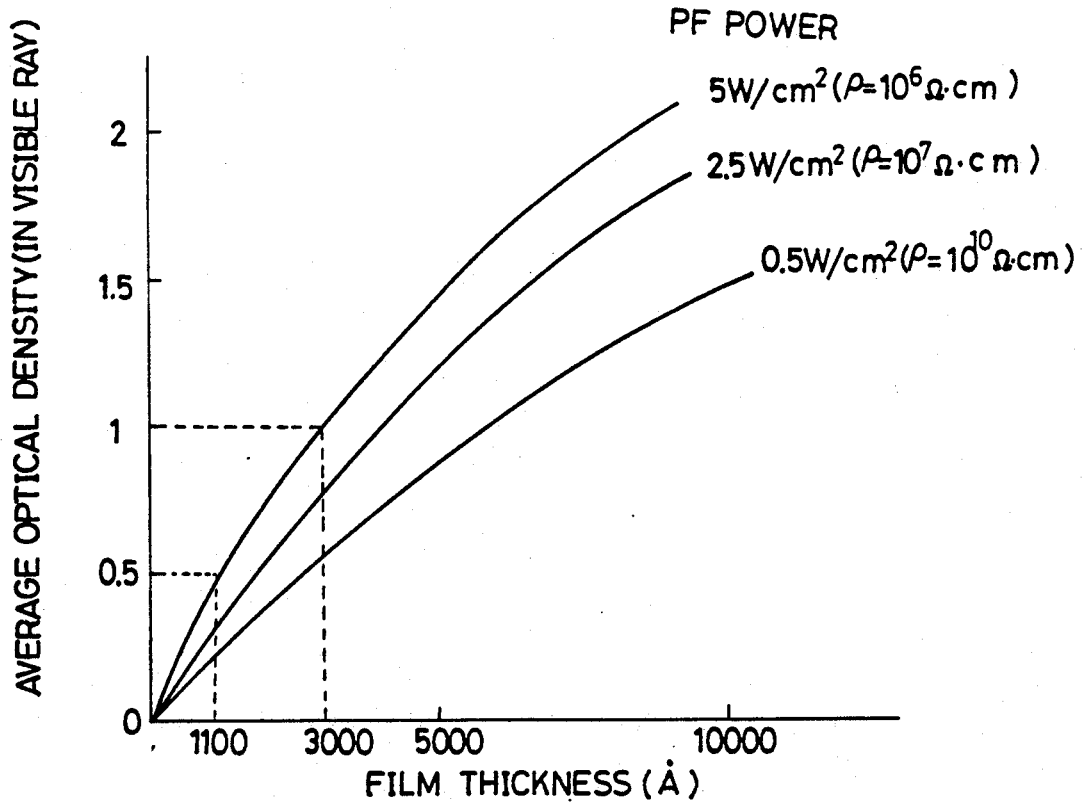
FIG. 8 is a graph illustrating the relationship between the film thickness and the average optical density of the hard carbon film.

The average optical density varies also depending on film-forming conditions and RF power (manufactured by a plasma CVD method), as shown in FIG. 8. Values in each of the parentheses-represent the specific resistivity of the film. As has been described above, since the specific resistivity of the hard carbon film is not less than $10^6$ ohm·cm, it can be seen from the figure that the film thickness is not less than 1100 Å when the average optical density is at least than 0.5, and not less than 3000 Å when the density is at least 1.0.

On the other hand, since the hard carbon film also functions as the insulator layer of the MIM device, the film thickness, in view of the driving conditions, is not more than 8000 Å, preferably not more than 6000 Å.

Description will be made more specifically to the liquid crystal display in accordance with the present invention, referring to the drawings.

In a liquid crystal display as shown in FIG. 1, a transparent electroconductive thin film of ITO, ZnO:Al, $SnO_2$ or $In_2O_3$ is formed to a thickness of several hundreds to several thousands of Å on a transparent substrate 1 such as glass, plastic plate or plastic film by a sputtering method, vaccum deposition method, etc. The transparent electroconductive thin film is etched into a predetermined pattern to form a picture element electrode 2.

A electroconductive thin film of Al, Ta, Ti, Cr, Ni, Cu, Au, Ag, W, Mo, Pt, ITO, AnO:Al, $SnO_2$ or $In_2O_3$ is formed to a thickness from several hundreds to several thousands of Å by a vaccum deposition method, etc. and then etched into a predetermined pattern to form a lower electrode 3. In the case where the material for the picture element electrode 2 contains In, it tends to react with a subsequently formed hard carbon film, reducing the electroconductivity. Accordingly, the lower electrode 3 is preferably patterned so as to cover the entire surface of the picture element electrode 2.

Then, a hard carbon film as an insulator layer 4 is formed to a thickness from 100 to 8000 Å (preferably 200 to 6000 Å, more preferably 300 to 4000 Å) by a plasma CVD method, ion beam method, etc. Successively a electroconductive thin film of Al, Cr, Ni, Pt, Ag, Au, Cu, Cr, Ti, W, Mo, Ta, ITO, ZnO:Al, $In_2O_3$ or $SnO_2$ is formed to a thickness from several hundreds to several thousands of Å by a sputtering method, vaccum deposition method, etc., and then is etched into a predetermined pattern to form an upper electrode (lead electrode) 5.

Then, $SiO_2$, $Si_3N_4$, $Al_2O_3$, a hard carbon film, polyimide, polyester, epoxy resin, polyamide, PVDC, PVDF, PVA, silicone resin or fluorocarbon is deposited as the insulator layer 6 to a thickness of from several hundreds of Å to several micrometers by a CVD method, sputtering method or coating method (spin coating method, roll coating method, dip coating method, ect.). The insulator layer then formed into a predetermined pattern. As the material for the insulator layer 6, photosensitive polymers such as polyimides, polyesters, or epoxy resins are preferred since the polymer can be synthesized under low temperature (UV irradiation), and a photoetching step for the patterning can be saved.

As the light-shielding layer 7, an opaque material such as Al, Ta, Ti, Cr, Ni, Cu, Au, Ag, W, Mo, Pt, Si, C or TiC was is formed as a film to a thickness of from several hundreds to several thousands of Å by a sputtering method, vaccum deposition method or CVD method, and then is etched to a predetermined pattern. Alternatively, the insulator layer 6 and the light-shielding layer 7 may be formed into films successively, and then be patterned with an identical mask pattern.

Finally, the insulator layer 4 and the lower electrode 3 (on picture element electrode) are etched by using a resist on the light-shielding layer 7. In these steps, if the light-shielding layer is added by means of the insulator layer, it does not increase the number of masks basically required for forming the MIM device and the cost is not increased so much.

In the liquid crystal display shown in FIG. 5, as the light-shielding material layer 7, material having an average optical density of less than about 1.0 in the visible ray region and having an insulative property (for example, a polymer selected from polyimides, polyamide imides, polyester imides, polyamides, polyester amides, polyether sulfones, etc. which are incorporated with a black dye, or a hard carbon film) is formed to a thickness of from several hundreds of Å to several micrometers by a coating method (spin coating method, roll coating method, etc.) or vapor phase synthesis process such as plasma CVD or an ion beam method, and is then etched into a predetermined pattern.

Finally, the insulator layer 4 and the lower electrode 3 are etched (on the picture element electrode) by using a resist on the light-shielding layer 7. In these steps, if the light-shielding layer 7 is added, the number of masks is not increased beyond that required for forming the MIM device, and the cost is not increased so much. In the case of the material for the light-shielding layer used in the constitution shown in FIG. 1, an optical density not less than 2 can be obtained easily, and light-shielding performance is excellent. On the other hand, the light-shielding material used for the constitution in FIG. 5 does not provide a constant transmission spectrum over all wavelengths, but the average optical density is not less than 1.0 in the visible ray region, and the purpose of shielding the non-modulation light can be attained satisfactorily.

In the liquid crystal display shown in FIG. 6, a hard carbon film is formed as the insulator layer 4 by a plasma CVD method, ion beam method, etc. Since the insulator layer also functions as the light-shielding layer, the film thickness is 1100 to 8000 Å, preferably 2000 Å to 6000 Å. If the thickness is less than 1100 Å, the light-shielding performance is not sufficient. On the other hand, if the thickness is too large, driving at a low duty ratio is difficult, and homogenity in the cell gap is difficult to obtain.

Then, an electroconductive thin film of Al, Cr, Ni, Pt, Ag, Au, Cu, Cr, Ti, W, Mo, Ta, ITO, ZnO:Al, In$_2$O$_3$ or SnO$_2$ is formed to a thickness of from several hundreds to several thousands Å by a sputtering method, vaccum deposition method, etc., and is then etched into a predetermined pattern to form an upper electrode (lead electrode) 5. Finally, the insulator layer 4 is etched into a predetermined pattern (for example, a pattern as shown by the hatched line in FIG. 1(b)) and the lower electrode 3 is etched (on picture element electrode) by an identical resist.

In the liquid crystal display shown in FIG. 6, since the insulator layer of the MIM device also serves as the light-shielding layer, there is no requirement for separately forming the light-shielding layer, and the production steps can be shortened remarkably.

In the liquid crystal display according to the present invention, a hard carbon film is used for the insulator layer in the MIM device. The hard carbon film has the merits described below:

(1) Since the hard carbon film is prepared by a vapor phase method such as plasma CVD, physical properties can be controlled over a wide range of values depending on the film-forming coniditions. Accordingly, the degrees of freedom in view of the device design are great.

(2) Since it is hard and can have a large thickness, it suffers less from mechanical damage. Also, the increased film thickness will reduced the number of pinholes.

(3) Since a film of good quality can be formed at a low temperature (near room temperature), there is no restriction as to the material for the substrate.

(4) Since the quality of the hard carbon film is excellent, especially in thickness homogeneity it is suitable for the thin film device.

(5) Since the dielectric constant is low, no high precision fabrication is required. Accordingly, it is advantageous for increasing the area of the device.

Therefore, the MIM device is suitable, in particular, for a highly reliable switching device for use in a liquid crystal display.

Further, in the liquid crystal display according to the present invention, since the light-shielding layer is disposed in a region other than the display region, the non-modulation light does not transmit and a high contrast display can be obtained.

EXAMPLE

The present invention will be explained referring to the examples, but the invention is not restricted only thereto, and various modifications are possible, such as those prepared by disposing a transparent picture element electrode at the uppermost layer after manufacturing an MIM, those comprising a transparent picture element electrode serving also as an upper or lower electrode, or those having an MIM device formed on the side of the lower electrode.

EXAMPLE 1

The liquid crystal display of this example is shown in FIG. 1.

At first, ITO was formed as a film on a glass substrate 1 to a thickness of 500 Å by a sputtering method, and then was etched to a predetermined pattern to form a picture element electrode 2.

Then, Al was formed as a film to a thickness of 1000 Å by a vaccum deposition method, and then was etched to a predetermined pattern to form a lower electrode 3. The lower electrode 3 was patterned so as to cover the entire surface of the picture element electrode 2, thus avoiding reduction of the electroconductivity. Then, a hard carbon film was formed as an insulator layer 4 to a thickness of 1100 Å by a plasma CVD method and, successively, Ni was formed as a film to a thickness of 1000 Å and then was etched into a predetermined pattern to form an upper electrode (lead electrode) 5. Then, SiO$_2$ was formed as a film as the insulator layer 6 to a thickness of 1 μm by a CVD method, and then was etched into a predetermined pattern. Then, Al was formed as a film as the light-shielding layer 7 to a thickness of 1000 Å by a sputtering method, and then was etched to a predetermined pattern. Finally, the insulator layer 4 and the lower electrode 3 were etched (on the picture element electrode 2) by using a resist on the light-shielding layer 7. The average optical density of the resultant light-shielding layer of the liquid crystal display was 3.5.

EXAMPLES 2-8

Liquid crystal displays were manufactured by the same procedures as those in Example 1, except for substituting the light-shielding materials shown in Table 2 in the light-shielding layer 7 by the film forming methods shown in Table 2.

The average optical density for the light-shielding layer in the resultant liquid crystal display was as shown in Table 2.

EXAMPLE 9

The liquid crystal display of this example is shown in FIG. 5.

Picture element electrode 2, lower electrode 3, insulator layer 4 and upper electrode 5 were formed by the same procedures as those in Example 1. Polyimide incorporated with carbon black having an average optical density of not less than about 1.0 in the visible ray region and having an insulative property was formed as a film as the light-shielding layer 7 to a thickness of 1.5 μm by a spin coat process, and etched into a predetermined pattern. Finally, the insulator layer 4 and the lower electrode 3 were etched (on picture element electrode) by using a resist on the light-shielding layer 7. The average optical density of the resultant light-shielding layer in the liquid crystal display was 1.5.

In examples 1-8, an optical density of not less than 2 was easily obtained, and the light-shielding performance was excellent. On the other hand, the transmission spectrum is not constant over all wavelengths in Example 9, but the average optical density is not less than 1.0 in the visible ray region, and the purpose of shielding non-modulation light attained sufficiently. In addition, although the possibility of causing a short-circuit due to pinholes, dusts, etc. in the insulation film can not be completely avoided in Examples 1-8. Such troubles do not occur at all in Example 9, and the yield was higher.

EXAMPLE 10

The liquid crystal display of this example is shown in FIG. 6.

Picture element electrode 2 and lower electrode 3 were formed in the same procedures as those in Example 1. A hard carbon film was formed as the insulator layer 4 by a plasma CVD method. Since the insulator layer also functioned as the light-shielding layer, the film thickness was made to 4000 Å.

Then, Ni was formed as a film to a thickness of 1000 Å by an EB vaccum deposition method and was then etched into a predetermined pattern to form an upper electrode (lead electrode) 5. Finally, the insulator layer 4 was etched into a predetermined pattern (for example, a pattern as shown by the hatched line in FIG. 1(b)) and the lower electrode was etched (on picture element electrode) by using an identical resist. The average optical density of the resultant light-shielding layer in the liquid crystal display was 1.2.

In this Example 10, since the insulator layer of the MIM device also served as the light-shielding layer, separate preparation for the film of the light-shielding layer was not necessary, and the production steps were shortened remarkably.

TABLE 2

| Example | Light-shielding material | Average optical density | Film forming method | Thickness of light shielding layer |
|---|---|---|---|---|
| 1 | Al | 3.5 | Vaccum deposition | 1000 Å |
| 2 | Cr | 3.0 | Sputtering | 1000 Å |
| 3 | Ni | 4.0 | EB vaccum deposition | 1000 Å |
| 4 | Au | 4.0 | EB vaccum deposition | 1000 Å |
| 5 | Ag | 4.0 | Vaccum deposition | 1000 Å |
| 6 | Pt | 4.0 | EB vaccum deposition | 1000 Å |
| 7 | Si | 2.0 | Sputtering | 1000 Å |
| 8 | C | 2.0 | Sputtering | 1000 Å |

What is claimed is:

1. A liquid crystal display comprising liquid crystal material sandwiched between two substrates, a plurality of picture element electrodes disposed on at least one inner surface of said substrates, a lead electrode connected with said picture element electrodes by means of at least one conductor-insulator-conductor device, wherein said insulator is a hard carbon film disposed in all regions of said liquid crystal display other than display regions above said picture element electrodes as a light-shielding layer, said hard carbon film having a thickness of from 1100 to 8000 Å, a specific resistivity ($\rho$) of from $10^6$ to $10^{13}$ ohm·cm, an optical band gap (Egopt) of from 1.0 to 3.0 eV, a hydrogen amount in the film ($C_H$) of from 10 to 50 atom %, an $SP^3/SP^2$ ratio of 2-4, a Vickers hardness of from 2500 to to 9500 kg·mm$^{-2}$, a refractive index (n) of from 1.9 to 2.4, a defect density of from $10^{17}$ to $10^{19}$ cm$^{-3}$, a specific dielectric constant of from 2 to 6, and an average optical density in the visible ray region of not less than 0.5.

2. The liquid crystal display of claim 1, wherein said hard carbon film has a thickness of from 2000 to 6000 Å.

3. The liquid crystal display of claim 2, wherein said hard carbon film has a thickness of from 3000 to 6000 Å.

4. A liquid crystal display according to claim 1, wherein the hard carbon film is doped with a group III element, a group IV element other than carbon, a group V element, an alkali metal element, an alkaline earth metal element, nitrogen, oxygen, a chalcogen element or a halogen element.

* * * * *